(12) United States Patent
Beloussov et al.

(10) Patent No.: US 7,461,148 B1
(45) Date of Patent: Dec. 2, 2008

(54) VIRTUAL PRIVATE SERVER WITH ISOLATION OF SYSTEM COMPONENTS

(75) Inventors: Serguei M Beloussov, Herndon, VA (US); Stanislav S Protassov, Singapore (RU); Alexander G Tormasov, Moscow (RU)

(73) Assignee: SWsoft Holdings, Ltd. (BM)

( * ) Notice: Subject to any disclaimer, the term of this patent is extended or adjusted under 35 U.S.C. 154(b) by 1187 days.

(21) Appl. No.: 10/703,594

(22) Filed: Nov. 10, 2003

Related U.S. Application Data

(63) Continuation-in-part of application No. 09/918,031, filed on Jul. 30, 2001, now Pat. No. 7,099,948.

(60) Provisional application No. 60/467,547, filed on May 5, 2003, provisional application No. 60/269,655, filed on Feb. 16, 2001.

(51) Int. Cl.
*G06F 15/16* (2006.01)
*G06F 15/173* (2006.01)
*G06F 15/167* (2006.01)
*G06F 9/45* (2006.01)
*G06F 9/46* (2006.01)
*G06F 13/28* (2006.01)
*G06F 7/38* (2006.01)
*G06F 3/00* (2006.01)
*G06F 3/048* (2006.01)
*G06F 9/44* (2006.01)
*G06F 13/00* (2006.01)
*G06F 9/00* (2006.01)
*G06F 17/00* (2006.01)
*G06F 12/00* (2006.01)
*G06F 9/455* (2006.01)
*G06F 15/00* (2006.01)

(52) U.S. Cl. .................. 709/226; 709/215; 709/229; 719/319; 711/152; 712/227; 703/22

(58) Field of Classification Search ................. 709/203, 709/215, 219, 226, 229, 236; 711/152, 153, 711/173; 718/1; 719/319; 726/15; 715/778; 712/227; 703/22
See application file for complete search history.

(56) References Cited

U.S. PATENT DOCUMENTS 5,761,477 A * 6/1998 Wahbe et al. .................. 718/1

(Continued)

FOREIGN PATENT DOCUMENTS

JP 2004274448 A * 9/2004

OTHER PUBLICATIONS

Killalea, T. "Recommended Internet Service Provider Security Services and Procedures," RFC 3013, Nov. 2000, pp. 1-13.*

(Continued)

*Primary Examiner*—Jason D Cardone
*Assistant Examiner*—Melvin H Pollack
(74) *Attorney, Agent, or Firm*—Bardmesser Law Group

(57) ABSTRACT

A server includes a host running an operating system kernel. Isolated virtual private servers (VPSs) are supported within the kernel. At least one application is available to users of the VPS. A plurality of interfaces give the users access to the application. Each VPS has its own set of addresses. Each object of each VPS has a unique identifier in a context of the operating system kernel. Each VPS is isolated from objects and processes of another VPS. Each VPS includes isolation of address space of each user from address space of a user on any other VPS, isolation of server resources for each VPS, and failure isolation. The server includes a capability of allocating (or reallocating) system resources to a designated VPS, allocating (or reallocating) system resources to a VPS in current need of such resources, dynamically allocating (or reallocating) VPS resources to a VPS when additional resources are available, and compensating a particular VPS in a later period for a period of under-use or over-use of server resources by the particular VPS in a current period. VPS resources are allocated for each time cycle. All the VPSs are supported within the same OS kernel.

80 Claims, 9 Drawing Sheets

U.S. PATENT DOCUMENTS

| | | | |
|---|---|---|---|
| 5,905,990 A | 5/1999 | Inglett | |
| 6,075,938 A * | 6/2000 | Bugnion et al. | 703/27 |
| 6,269,409 B1 * | 7/2001 | Solomon | 719/329 |
| 6,332,180 B1 * | 12/2001 | Kauffman et al. | 711/153 |
| 6,374,286 B1 * | 4/2002 | Gee et al. | 718/108 |
| 6,381,682 B2 * | 4/2002 | Noel et al. | 711/153 |
| 6,385,643 B1 * | 5/2002 | Jacobs et al. | 709/203 |
| 6,397,242 B1 * | 5/2002 | Devine et al. | 718/1 |
| 6,460,082 B1 * | 10/2002 | Lumelsky et al. | 709/226 |
| 6,496,847 B1 * | 12/2002 | Bugnion et al. | 718/1 |
| 6,542,926 B2 * | 4/2003 | Zalewski et al. | 709/213 |
| 6,560,613 B1 | 5/2003 | Gylfason et al. | |
| 6,601,110 B2 * | 7/2003 | Marsland | 719/310 |
| 6,618,736 B1 | 9/2003 | Menage | |
| 6,633,916 B2 * | 10/2003 | Kauffman | 709/229 |
| 6,647,508 B2 * | 11/2003 | Zalewski et al. | 714/3 |
| 6,681,310 B1 * | 1/2004 | Kusters et al. | 711/202 |
| 6,687,762 B1 * | 2/2004 | Van Gaasbeck et al. | 719/319 |
| 6,697,876 B1 * | 2/2004 | van der Veen et al. | 719/313 |
| 6,732,211 B1 * | 5/2004 | Goyal et al. | 710/261 |
| 6,754,716 B1 * | 6/2004 | Sharma et al. | 709/238 |
| 6,772,419 B1 * | 8/2004 | Sekiguchi et al. | 719/319 |
| 6,802,063 B1 * | 10/2004 | Lee | 718/1 |
| 6,816,941 B1 * | 11/2004 | Carlson et al. | 711/111 |
| 6,845,387 B1 * | 1/2005 | Prestas et al. | 709/203 |
| 6,854,009 B1 * | 2/2005 | Hughes | 709/220 |
| 6,862,650 B1 * | 3/2005 | Matthews et al. | 711/6 |
| 6,886,165 B1 * | 4/2005 | Muller et al. | 719/310 |
| 6,907,421 B1 * | 6/2005 | Keshav et al. | 707/2 |
| 6,912,221 B1 * | 6/2005 | Zadikian et al. | 370/395.21 |
| 6,941,545 B1 * | 9/2005 | Reese et al. | 717/130 |
| 6,957,237 B1 * | 10/2005 | Traversat et al. | 707/206 |
| 6,976,054 B1 * | 12/2005 | Lavian et al. | 709/203 |
| 6,976,258 B1 * | 12/2005 | Goyal et al. | 718/104 |
| 6,985,937 B1 * | 1/2006 | Keshav et al. | 709/223 |
| 6,996,828 B1 * | 2/2006 | Kimura et al. | 719/319 |
| 7,035,963 B2 * | 4/2006 | Neiger et al. | 711/6 |
| 7,099,948 B2 * | 8/2006 | Tormasov et al. | 709/229 |
| 7,143,024 B1 * | 11/2006 | Goyal et al. | 703/21 |
| 7,219,354 B1 * | 5/2007 | Huang et al. | 719/328 |
| 7,225,441 B2 * | 5/2007 | Kozuch et al. | 718/1 |
| 7,266,595 B1 * | 9/2007 | Black et al. | 709/223 |
| 7,275,246 B1 * | 9/2007 | Yates et al. | 718/100 |
| 7,356,817 B1 * | 4/2008 | Cota-Robles et al. | 718/1 |
| 2002/0065917 A1 * | 5/2002 | Pratt et al. | 709/226 |
| 2002/0112090 A1 * | 8/2002 | Bennett et al. | 709/319 |

OTHER PUBLICATIONS

Barham, Paul et al. "Xen and the Art of Virtualization," Proceedings of the ACM Symposium on Operating Systems Principles (SOSP), Oct. 19-22, 2003, pp. 1-14.*

Banga, Gaurav et al. "Resource Containers: A New Facility for Resource Management in Server Systems," USENIX Association Third Symposium on Operating Systems Design and Implementation (OSDI), 1999, pp. 45-58.*

Zhang, Wensong. "Linux Virtual Server for Scalable Network Services," Ottawa Linux Symposium, 2000, pp. 1-10.*

* cited by examiner

VIRTUAL PRIVATE SERVER WITH ISOLATION OF SYSTEM COMPONENTS

CROSS-REFERENCE TO RELATED APPLICATIONS

This application is a continuation-in-part of U.S. patent application Ser. No. 09/918,031, filed on Jul. 30, 2001, which is a non-provisional of U.S. Provisional Patent Application No. 60/269,655, filed on Feb. 16, 2001, and to U.S. Provisional Patent Application No. 60/467,547, filed on May 5, 2003, which are all incorporated by reference herein.

BACKGROUND OF THE INVENTION

1. Field of the Invention

The present invention is related to virtual private servers, and more particularly, to isolated virtual private servers that appear to a user as a stand-alone server.

2. Related Art

With the popularity and success of the Internet, server technologies are of great commercial importance today. An individual server application typically executes on a single physical host computer, servicing client requests. However, providing a unique physical host for each server application is expensive and inefficient.

For example, commercial hosting services are often provided by an Internet Service Provider (ISP), which generally provides a separate physical host computer for each customer on which to execute a server application. However, a customer purchasing hosting services will often neither require nor be amenable to paying for use of an entire host computer. In general, an individual customer will only require a fraction of the processing power, storage, and other resources of a host computer.

Accordingly, hosting multiple server applications on a single physical computer is desirable. In order to be commercially viable, however, every server application needs to be isolated from every other server application running on the same physical host. Clearly, it would be unacceptable to customers of an ISP to purchase hosting services, only to have another server application program (perhaps belonging to a competitor) access the customer's data and client requests. Thus, each server application program needs to be isolated, receiving requests only from its own clients, transmitting data only to its own clients, and being prevented from accessing data associated with other server applications.

Furthermore, it is desirable to allocate varying specific levels of system resources to different server applications, depending upon the needs of, and amounts paid by, the various customers of the ISP. In effect, each server application needs to be a "virtual private server" or VPS, simulating a server application executing on a dedicated physical host computer.

Such functionality is unavailable on traditional server technology because, rather than comprising a single, discrete process, a virtual private server must include a plurality of seemingly unrelated processes. Each process performs various elements of the sum total of the functionality required by the customer. Because each virtual private server includes a plurality of processes, traditional server technology has been unable to effectively isolate the processes associated with one virtual private server from those processes associated with other virtual private servers.

Another difficulty in implementing multiple virtual private servers within a single physical host involves providing each server with a separate file system. A file system is an organized accumulation of data within one or more physical storage devices, such as a hard disk drive or RAID (redundant array of inexpensive disks). The data is typically organized into "files," such as word processing documents, spreadsheets, executable programs, and the like. The files are stored within a plurality of "storage units" of the storage device, sometimes referred to as "disk blocks" or "allocation units."

Unfortunately, providing a separate physical device for storing the file system of each virtual private server would be expensive and inefficient. Accordingly, it would be desirable to store the file systems of multiple virtual private servers within the same physical device or comparatively small set of devices.

Thus, a major problem with conventional VPS implementations is the lack of isolation between the VPSs. This means that a conventional VPS has to operate in a "friendly environment," relying on other VPSs and other applications running in those other VPSs to not invade its address space, or to utilize more than their share of resources. This is also sometimes known as a cooperative environment (vs. non-cooperative environment, where users or applications of one VPS cannot be trusted to not modify data that does not belong to them or to not attempt to "hog" all system resources). However, there is a difficulty of utilizing "cooperative" VPSs in any number of applications. For example, in the web server context, it is assumed that the host will be subject to attack by hackers. No assumption of a friendly environment can be made in that case. Also, in the absence of isolation between the VPSs, one VPS can "hog" more than its share of system resources, or can affect and/or modify objects and data that belong to other VPSs.

Accordingly, there is a need for an effective way of isolating the VPSs from one another in a server environment.

SUMMARY OF THE INVENTION

Accordingly, the present invention is related to a virtual private server with isolation of server components that substantially obviates one or more of the disadvantages of the related art.

In one embodiment, there is provided a server including a host running an operating system kernel. A plurality of isolated virtual private servers (VPSs) are supported within the operating system kernel. At least one application is available to users of the VPS. A plurality of interfaces give the users access to the plurality of applications.

Each VPS has its own virtual address space (or its own set of addresses), which includes memory, IP addresses, disk drive addresses, SMB network names, TCP names, pipe names, etc. Each VPS has its own objects and data structures. Each of the objects and the data structures of each VPS has a unique identifier in a context of the operating system kernel. Each VPS cannot affect data structures of another VPS, or objects of another VPS, and cannot access information about processes running on another VPS. Each VPS includes isolation of address space of each user from address space of a user on any other VPS, isolation of server resources for each VPS, and isolation of application program failure effects on any other VPS. The server resources include any of a virtual memory allocated to each user, a pageable memory allocated in the OS kernel to support the VPSs, a pageable memory used by the OS kernel for support of user processes either in shared, or in exclusive form (i.e., either in support of user processes of one VPS, or in support of user processes of multiple VPSs), a resident memory allocated in the OS kernel, physical memory used by the user processes, a share of CPU resources, security descriptors (or other identifiers related to the rights of the users and the VPSs), objects and data structures used by the OS kernel, I/O interfaces and their utilization level by the particular VPS, file and/or disk space, and individual user resource limitations.

Each VPS typically includes a plurality processes, each with at least one thread servicing corresponding users, a plurality of objects associated with the plurality of threads, a set of user and group IDs that unique in the context of a VPS corresponding to users and groups of a particular VPS, a set of configuration settings corresponding to each VPS stored within the VPS and a corresponding set of configuration settings for all VPSs stored by the kernel, a unique file space, means for management of the particular VPS, means for management of services offered by the particular VPS to its users, and means for delivery of the services to the users of the particular VPS.

The server includes a capability of allocating any of the system resources to a designated VPS, a capability of allocating any of the system resources to a VPS in current need of such resources, a capability of dynamically allocating any of the VPS resources to a VPS when additional resources are available, and a capability of compensating a particular VPS in a later period for a period of under-use or over-use of server resources by the particular VPS in a current period. The server can force a VPS return allocated resources to a common pool of resources, or the VPS may relinquish the resources allocated to it. The server defines a set of time cycles, such that VPS resources are allocated or reallocated for each such time cycle. The server dynamically partitions and dedicates resources to the VPSs based on a pre-established service level agreement. All the VPSs are supported within the same OS kernel. Some functionality of the VPSs can be supported in user space.

The server software can be an add-on to any of Microsoft Windows NT Server—Terminal Server Edition, Microsoft Windows 2000 Server—Terminal Server, and Microsoft Windows Server 2003—Terminal Services, or any server based on a Microsoft Windows product. The operating system includes a plurality of threads for execution of user requests. The VPSs appear to a user as substantially stand-alone servers, and generally provide the functionality of a stand-alone server or remote computer, including all administrative operations.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

DETAILED DESCRIPTION OF THE INVENTION

Figure 1A:
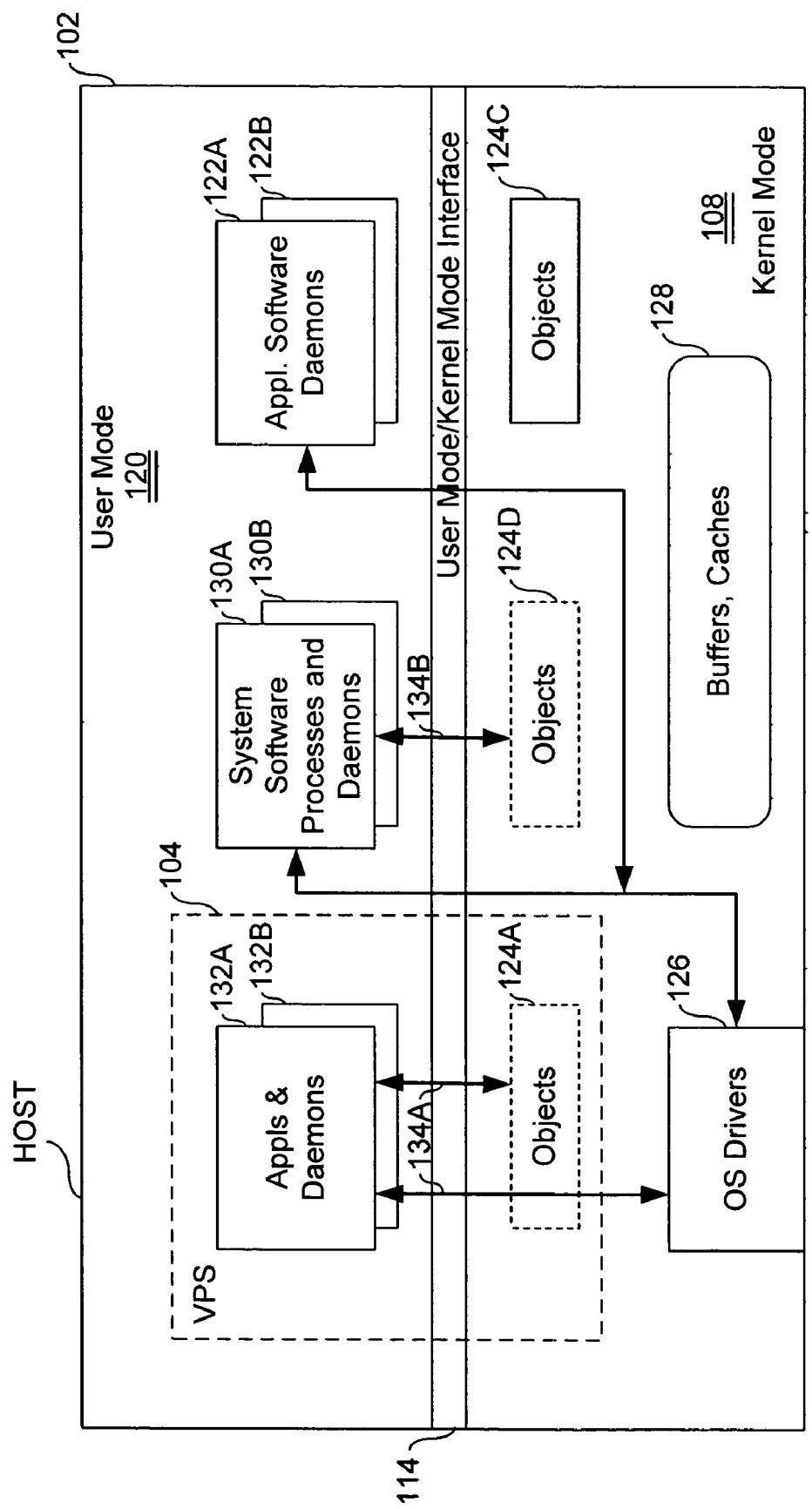
FIGS. 1A-1B show a system block diagram of one embodiment of the present invention.

Reference will now be made in detail to the preferred embodiments of the present invention, examples of which are illustrated in the accompanying drawings.

The present invention is directed to a system, method and computer program product for creating and managing virtual private servers or VPSs. A VPS is a closed set, or collection, of processes, system resources, users, groups of users, objects and data structures. Each VPS has an ID, or some other identifier, that distinguishes it from other VPSs. The VPS of the present invention offers to its users a service that is functionally substantially equivalent to a standalone server with remote access. From the perspective of an administrator, the VPS of the present invention appears substantially the same as a dedicated computer at a data center. For example, the administrator of the VPS of the invention has the same remote access to the server through the Internet, the same ability to reload the server, load system and application software (except modifications of the OS kernel and loading arbitrary kernel drivers or modules, and direct access to the hosts' physical hardware without support from the VPS implementation), launch VPS users, establish disk space quotas of the users and user groups, support storage area networks (SANs), set up and configure network connections and webservers, etc. In other words, substantially the full range of system administrator functions are available as if the VPS were a dedicated remote server, with the existence of the VPS being transparent from the perspective of both the VPS user and the VPS system administrator. From the user perspective, the VPS functionally acts essentially like a remote server, and offers the same services, for example, through a dedicated IP address. Note that some processes running in kernel mode can provide services to multiple VPSs. Note also that due to locality of particular resources and data related to a particular VPS, the present invention lends itself to supporting migration of a VPS to another physical host (e.g., another host in a cluster) by transfer of all data related to the VPS from one physical host to another. See U.S. Provisional Patent Application No. 60/467,547, filed on May 5, 2003, which is incorporated by reference herein.

This approach has a number of advantages compared to conventional approaches, particularly in the fields of webhosting and server enterprise consolidation. The system administrator does not require any special training, since the VPS functions essentially identically to a standalone server, and the administrator operations are the same. Furthermore, the launch of multiple VPSs in the same host permits a higher level of server utilization. With effective VPS resource isolation, it is possible to offer a guaranteed level of resource availability specified in a service level agreement (SLA).

It should be noted that, although there is no standard terminology, in a multi-process environment such as being described herein, processes (sometimes called "actors") generally are thought of as including one or more threads and related data (as well as non-thread related data), and threads can have sub-threads or fibers. It will be appreciated that this discussion is intended to be descriptive only, and the invention is not limited to the specific terminology, since and different operating systems use different terms for threads (sometimes, for example, also called "lightweight processes").

One embodiment of the present invention includes a physical computer (usually called a "host") that is configured to run multiple isolated virtual private servers (VPSs). The host includes an operating system (OS) kernel. The kernel runs a number of processes and threads for execution of various system related processes. The host also includes a number of processes running on the server that correspond to the VPSs, with typically at least one user connected to at least one VPS.

The host can include: a physical memory, such as a dynamic random access memory (RAM) used by the various processes and threads. A virtual memory is allocated to each user or kernel process. A memory is allocated to the kernel of the operating system (either physical, pageable or non-pageable memory), and to various objects and data structures used by the operating system. The system may also include various storage elements, such as caches, and operating system buffers. The computer system also includes a central processing unit (CPU), or optionally multiple CPUs, whose time may be shared between and among the VPSs. A number of peripheral devices may be included, such as disk storage devices, input/output interfaces, network interfaces, etc. The storage mechanisms, particularly disk storage, may include a number of data files, databases, metadata storage and various other permanently and temporarily stored data objects.

Generally, as used in this description, the operating system kernel has one or more "processes" running within inside kernel mode. The operating system itself may be viewed as a process. The OS process has its own objects for its own internal use, as well as a number of objects that are representative of the VPSs supported within it.

Each VPS is therefore a set of processes running within user mode and having support from the operating system kernel. Each such VPS typically has a number of OS users and groups, with objects representative of the users associated with the particular VPS. Also, each VPS typically has a number of processes and threads that correspond to, for example, application software run by a particular OS user. Each of these processes can also have multiple threads (sub-threads) running within them, sometimes called "fibers."

Each of the OS users typically has a unique identifier. For example, each user may have an identifier that is unique in the context of its own VPS, and which may be, but not necessarily, unique in the context of the host. Alternatively, each VPS may own user IDs, such that each user has a globally unique identifier within the host or domain of computers.

The VPS also includes a number of interfaces that permit the users to access the various services available on the server and on the kernel. Such interfaces include system calls, shared memory interfaces, I/O driver control (ioctls), and similar mechanisms. The operating system kernel includes a number of execution threads, lightweight processes, and/or other primitives for execution of the services to the users and for servicing user requests. Each VPS typically has its own "virtual address space" that may be partitioned among its users.

The OS kernel also typically uses a number of objects and data structures, each of which has an identifier that is unique within the context of the operating system kernel. Such identifiers are sometimes known as handles or descriptors (or sometimes they can simply be kernel memory addresses), depending on the particular OS implementation.

The operating system kernel also includes a number of processes, threads, lightweight processes, or other primitives running inside kernel address space in kernel mode. Typically, the kernel has its own virtual address space, and includes a number of objects and structures servicing the OS kernel processes. The kernel also may include a number of structures and objects that service the processes run by the users. The kernel may also include mechanisms for management and enumeration of operating system and VPS objects and structures, when such objects and structures are utilized by the OS kernel itself and by various processes run by the users and/or by the VPSs.

Each VPS typically includes a number of processes, threads, lightweight processes, and other primitives for servicing the users of that particular VPS. Each VPS also typically has its own objects and data structures that are associated with the processes and threads of that particular VPS. Each VPS may also include a number of objects and data structures utilized by the operating system for control of that VPS. Each VPS also may include its own set of OS users and groups, each of which has a unique ID in the context of that particular VPS, but, as noted above, not necessarily unique in the context of the entire host or other VPSs. Each VPS also preferably includes its own file/disk space, which is allocated by the kernel for exclusive use by that VPS.

The VPS typically offers a number of services to the users. Examples of such services may be database access, webpage access, use of application software, remote procedure calls, etc.

Each VPS offers a number of services to users of that VPS, which are implemented as processes within that VPS. From the perspective of the user, the existence of the VPS is transparent, such that to the user it appears that he has an entire remote server dedicated to himself.

Figure 1B:
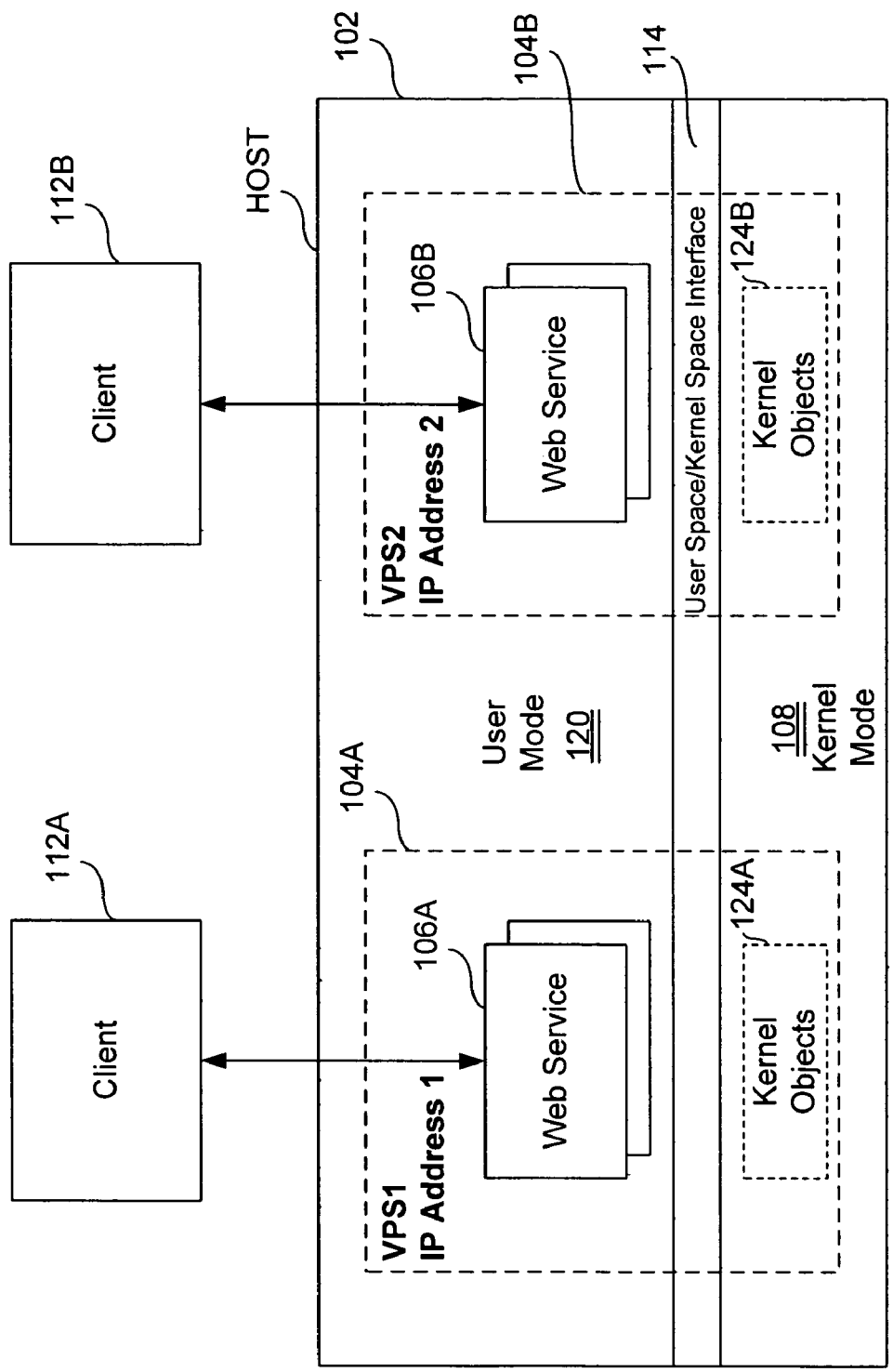

The system of the present invention will be further described with the aid of FIGS. 1A and 1B. Here, FIG. 1A is intended to illustrate the general case, and FIG. 1B, the application of the present invention to a webserver context. A host 102 is running an operating a system with a kernel 108. Two VPSs 104A and 104B are shown, each with their own IP address space. Within each VPS 104, a web server is running (here, designated by 106A, 106B, respectively). It will be appreciated that the web server example is used only for illustration purposes, and any remote server functionality may be implemented. Also, in FIGS. 1A and 1B, 114 designates an operating system interface (for example, typically including system calls, I/O controls (ioctls/fcntls), drivers, etc., which are used for communication between user space (user mode) 120 processes and kernel space (kernel mode) 108 processes). In this context, the OS kernel 108 is the protected part of the operating system, typically the part that is essential to the functioning of the host 102. Also, other, non-critical, applications may be loaded (e.g., the "Minesweeper" game in Microsoft Windows is a well known example of such a non-critical application that is typically a part of the loaded operating system, but is not a critical part).

122A, 122B are a set of applications and daemons running in user mode 120. The server also includes a number of application programs, system services, daemons, and similar constructs typically utilized by the users (for example, Microsoft Word, database software, webpage servers, remote procedure calls, support daemons, Telnet servers, etc.). 124A is a set of objects and data structures associated with a process that runs in the user mode 120, even though the objects and data structures 124A themselves exist in the kernel mode 108.

124A, 124B designate a set of objects associated with a particular process. 124D designates a set of objects and data structures associated with operating system software processes. 124C designates a set of objects and structures that are used by the OS kernel 108 itself, for its own purposes. 126 designates operating system hardware drivers. 128 designates OS kernel buffers, caches, and other similar structures that are used for storage, and typically that have enumeration ability.

130A, 130B are system software processes and daemons. 132A, 132B are applications and daemons that exist in user space 120. Other examples of daemons include, for example, web server daemons that interact with Internet Explorer, RPC port mapper servers (i.e., servers that do not directly interface with users), etc.

134A, 134B designate communications between user space 120 processes and kernel space 108 processes. In the present invention, the isolation between the VPSs 104 is done at the kernel level. Some of the VPS 104 functionality may be implemented in user space 120.

The web servers 106A, 106B are connected to users (clients), in this case one client each, designated as 112A and 112B, respectively. Here, the client 112 is an example of a user. Another example of a user may be a VPS administrator. As noted above, the kernel 108 has a set of objects (here labeled as kernel objects 124A, 124B) that are representative of the VPS 104A, 104B, respectively. The client 112A can connect to the web server 106A using an IP address 1. The client 112B can connect to the web server 106B through an IP address 2. These are isolated, i.e., non-shared, addresses. The objects and structures associated with VPS 104A are distinct and isolated from the objects and structures associated with VPS 104B.

Additionally, each VPS 104A, 104B has its own set of resources, for example, its own disk space, file space, its own share of common network adapter bandwidths, etc. The failure or error of web server 106A will not influence or interfere with the activities of VPS 104B. Thus, the client 112B can continue accessing its web server 106B even in the event of program failure or crash on the VPS 104A side. It will be appreciated that although the example of FIG. 1B is in only terms of two VPSs 104A, 104B, in actuality, any number of VPSs 104 may be running on the host 102 (e.g., thousands), limited only by physical system parameters, CPU speed, bandwidth and other resources limitations.

The amount of system resource use may be regulated by the operating system kernel 108, particularly by establishing limits on system resource use for each VPS 104. In particular, the operating system kernel 108 allows reserving a particular system resource for a particular VPS 104. Various algorithms may be used to insure that only actual users of a particular system resource are allocated that resource, thus avoiding allocating a share of system resources, to those VPSs 104 that do not have users utilizing those resources at that particular time. Furthermore, the operating system kernel 108 dynamically allocates resources for the VPSs 104. Optionally, the resources allocated to a particular VPS 104 may exceed its originally (for example, SLA-established) limits, when such resources are available to be utilized, assuming other VPSs 104 are not utilizing those resources. The resource allocation mechanism also allows compensation for over-use or under-use by a particular VPS 104 in a particular time period (time slice). Thus, if one VPS 104 under-utilizes its allocated system resources during one time slice, it may be allocated a greater share of system resources during the next time slice, and vice versa.

As noted above, each VPS 104 has a share of system resources allocated to it. The resources allocated to each VPS 104 (for example, memory, file space, I/O, etc.) are isolated from each other through the use of a VPS ID and other specific kind of addressing. In the absence of active user processes utilizing the relevant resources (in other words, when other VPSs 104 are under-utilizing their resources), another VPS 104 can take advantage of that by utilizing more than its originally allocated share of system resources if permitted by host configuration settings.

Figure 2:
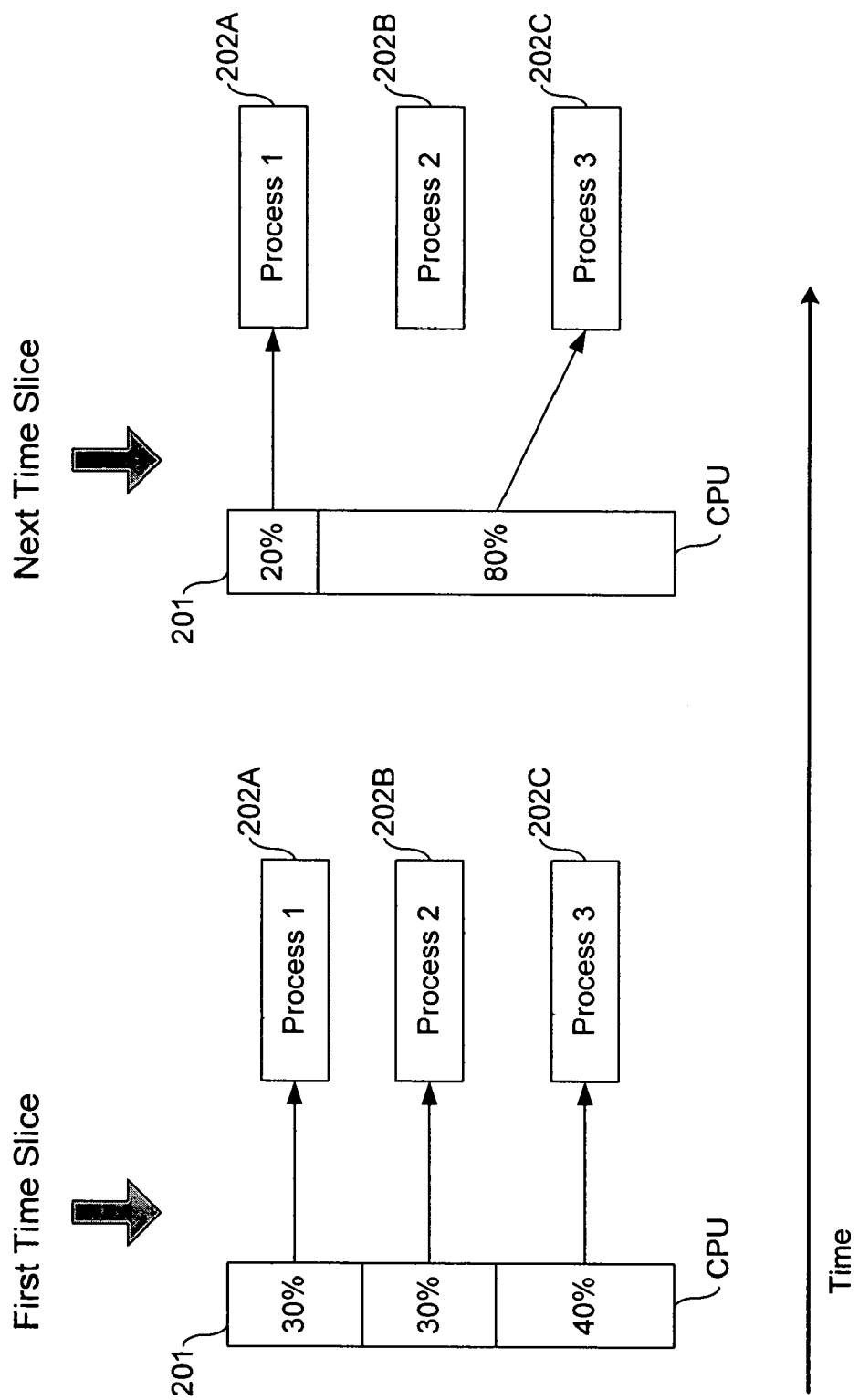
FIG. 2 illustrates an example of CPU resource management.

FIG. 2 illustrates an example of resource management, as discussed above. As shown in FIG. 2, a number of user processes, labeled 202A, 202B, 202C are running on a CPU 201, with the percentage of CPU resources allocated as shown –30%, 30%, and 40%, respectively, at time slice 1. As time progresses and the next time slice begins, process 202B is inactive, and process 1 requires only 20% of CPU utilization during that particular slice. Accordingly, process 202C is able to utilize the remaining 80% of the CPU resources. This may be referred to as a soft limit if the user running process 202C is allotted 40% of CPU time under his service level agreement. If the 40% figure is a "soft upper limit," the operating system kernel 108 will allocate the entire remaining 80% of the CPU resources to process 202C. On the other hand, if the 40% limit is a "hard limit," then the CPU usage by process 202C would remain at 40%. A similar approach may be taken with almost any system resource, for example, network bandwidth, disk space, memory usage, etc.

Figure 3:
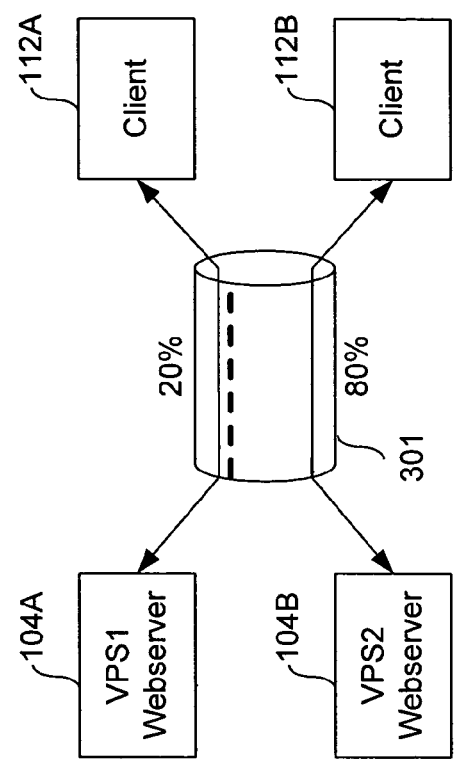
FIG. 3 illustrates an example of dynamic partitioning of resources in a context of bandwidth allocation.
Figure 3:
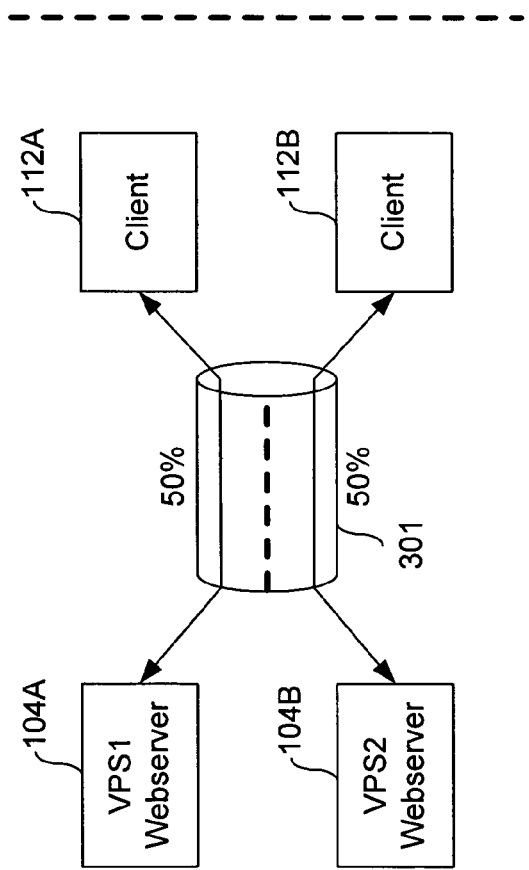

FIG. 3 illustrates an example of dynamic partitioning of resources in a context of bandwidth allocation. In FIG. 3, 301 designates a communication channel, for example, an Internet link. Initially, both webservers 106A, 106B are connected to their respective user processes (clients) 112A, 112B, sharing the communications link 301, with 50% of the bandwidth allocated to each. If the service level agreement for user process 112B includes a soft limit on bandwidth then, when user process 112A only requires 20% of the bandwidth of the channel 301, the entire remaining 80% of the bandwidth can be dynamically allocated to user process 112B.

Figure 4:
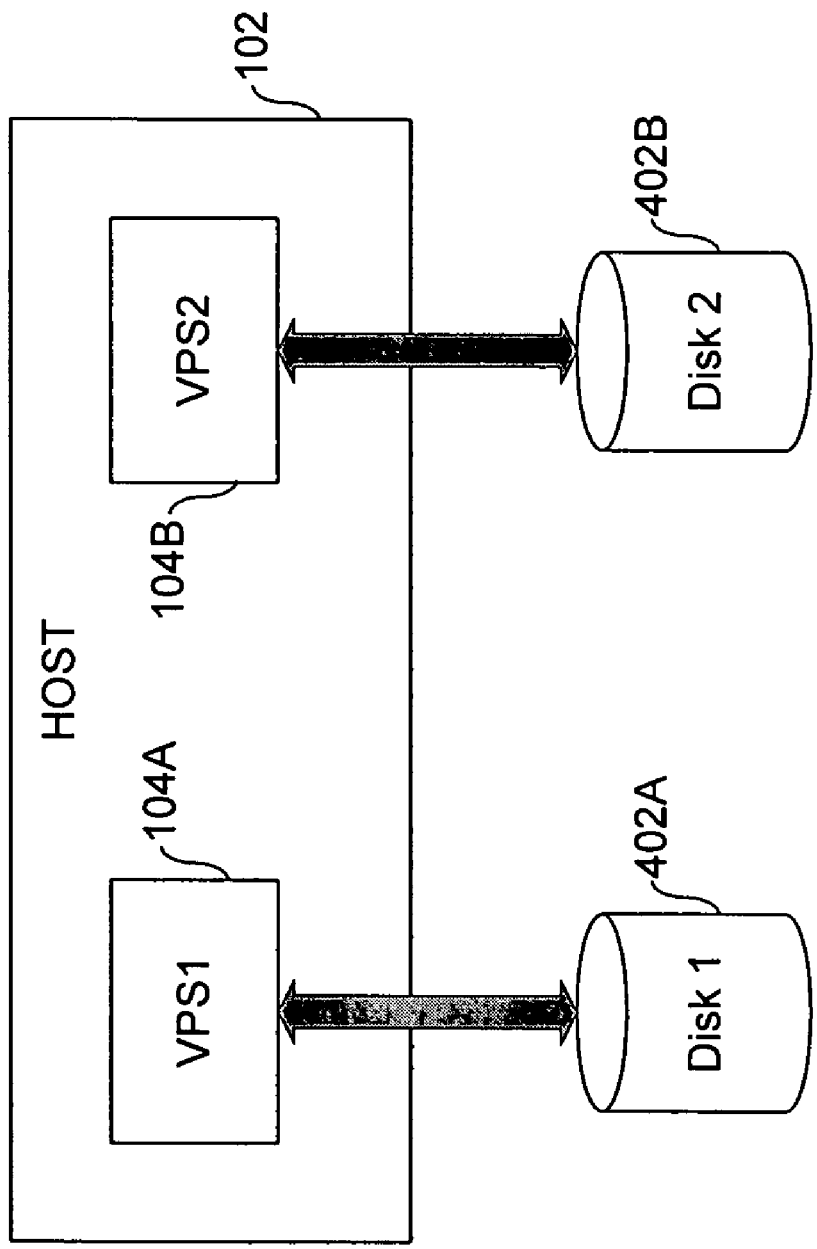
FIG. 4 illustrates an example of resource dedication.

FIG. 4 illustrates an example of resource dedication. As shown in FIG. 4, the host 102, running two VPSs 104A, 104B may be connected to two disk drives 402A, 402B. Each VPS 104 is allocated a dedicated disk drive. These may be either physical disk drives or virtual disk drives, such that each VPS 104A, 104B can only access its own disk drive 402A, 402B, respectively, and is unaware of the existence of any other VPS's disk drive.

To enable the resources allocation mechanism to each VPS 104, time slices (or time cycles) are defined such that resources are allocated on a time slice basis and (if necessary) reallocated during the next time slice. Different time slices can be defined for different resource classes. The system determines the amount of resources necessary for each VPS 104 to perform its function prior to the beginning of the next time slice. The system resources may be dynamically partitioned and dedicated, so as to ensure that the resources are allocated in accordance with the established level of service level agreement (SLA) for each VPS 104.

Figure 5:
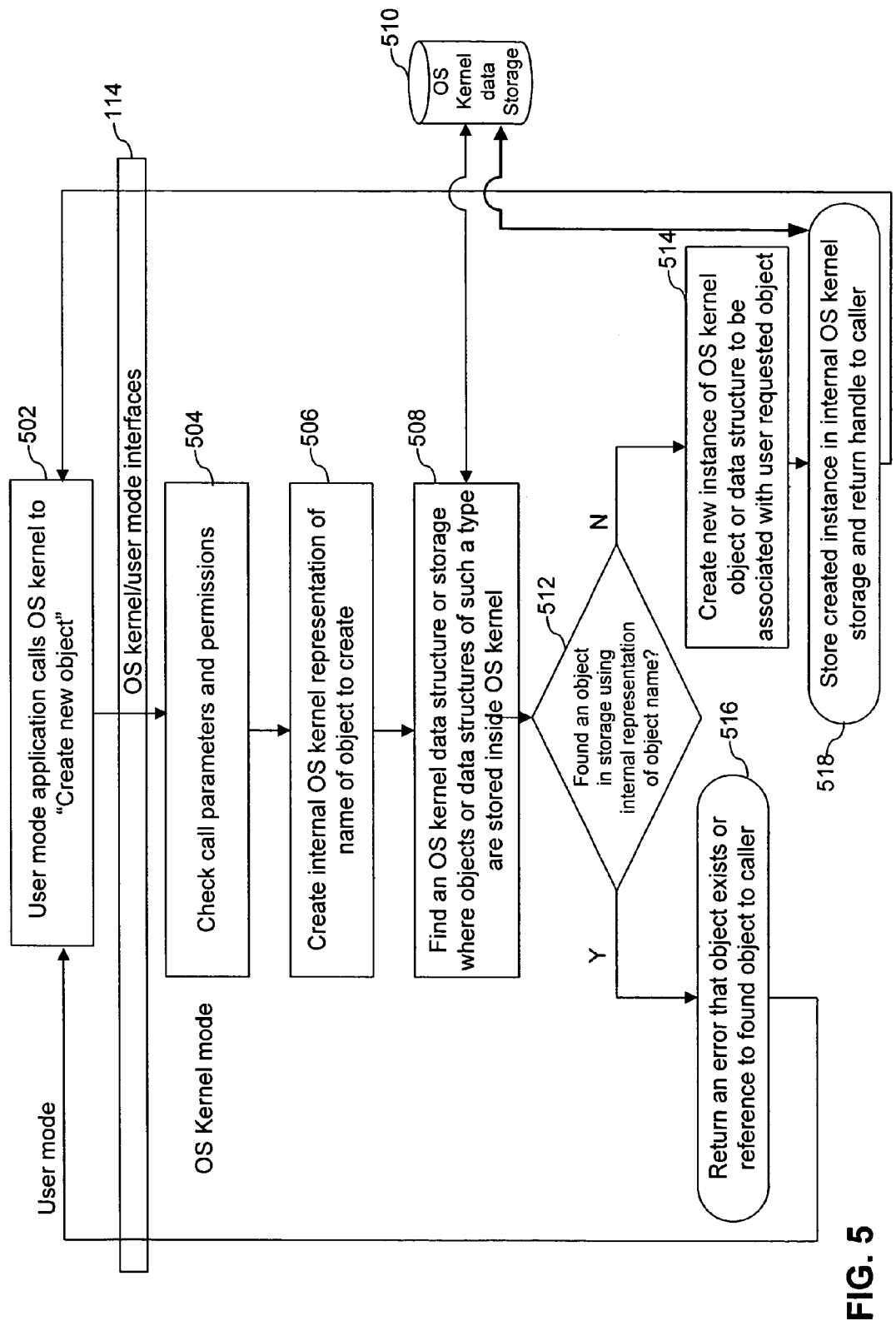
FIG. 5 illustrates one method of object creation in a VPS.

FIG. 5 illustrates one approach to the life-cycle of a VPS object using kernel mode interfaces 114. As shown in FIG. 5, a user mode application calls the OS kernel 108 to create a new object (step 502). The OS kernel 108 checks the call parameters and permissions associated with the calling process (step 504). An internal OS kernel representation of the object is created, including a name of the object about to be created (step 506). A kernel data structure is identified where objects or data structures of this type are stored for use by the OS kernel 108 (step 508). The process then checks whether it found an object in storage 510 using the kernel representation of the object name (step 512). The storage 510 may be used both by the kernel 108 and by the VPSs 110. If yes, then an error is returned to the calling process, indicating that such an object already exists (step 516) and the process then returns to step 502 (depending on the parameters of the call in step 502).

If the object is not found, a new instance of the OS kernel object is created, to be associated with the object requested by the calling process (step 514). The instance of the name (or similar object ID) object is stored in the storage 510, and a handle (i.e., an identifier) is returned to the caller (step 518). The process then returns to step 502 and the requesting (calling) process continues its execution.

Thus, in the conventional approach, the operating system, upon creation of a user process, or upon response to an existing user process, can create internal objects and data structures that are meant for storage of service information associated with the requesting user process. For example, upon creation of an instance of a process, it is usually necessary to create a special table, which later is used for storage of open process handles and their associated system objects. For example, files and sockets, which this user process can utilize for its functioning, may need to be created. These objects may be unique for a particular process, or they may be associated with a number of different processes simultaneously (for example, the image of an executable file stored in a cache may be used by different processes). The objects themselves must be stored in the data structures of the operating system kernel, in order for the operating system to be able to remove them, add to them, search them, etc. This is the purpose of the storage 510 in FIG. 5.

The storage 510 may be, for example, dynamic random access memory, caches, buffers, files, etc. Other examples of storage 510 include a hash table to store IP addresses that are related to network interfaces, a linked list of processes initialized in the operating system kernel, a cache of pages associated with a disk (disk read and disk write cache), virtual memory descriptors for particular processes that correspond between virtual pages and physical pages in the memory, and swap file descriptors.

Step 506, as described above, means that the operating system kernel, when servicing a system call, must be able to work with a representation of an object name within the kernel. This representation (which may be referred to as a "name") may be, for example, similar in some sense to the original. For example, it can be a complete file name. It may also be, for example, an internal memory address that corresponds to a data structure that is responsible for a particular user object.

With further reference to step 516, the exact nature of what is returned to step 502 depends on the call options. Thus, for example, it may be that in response to an attempt to create a file with an existing name, a message will be returned that such a file cannot be created because it already exists, giving the user an option to overwrite it. As an alternative, the user may be prompted with a question of whether he wants to open the existing file.

Figure 6:
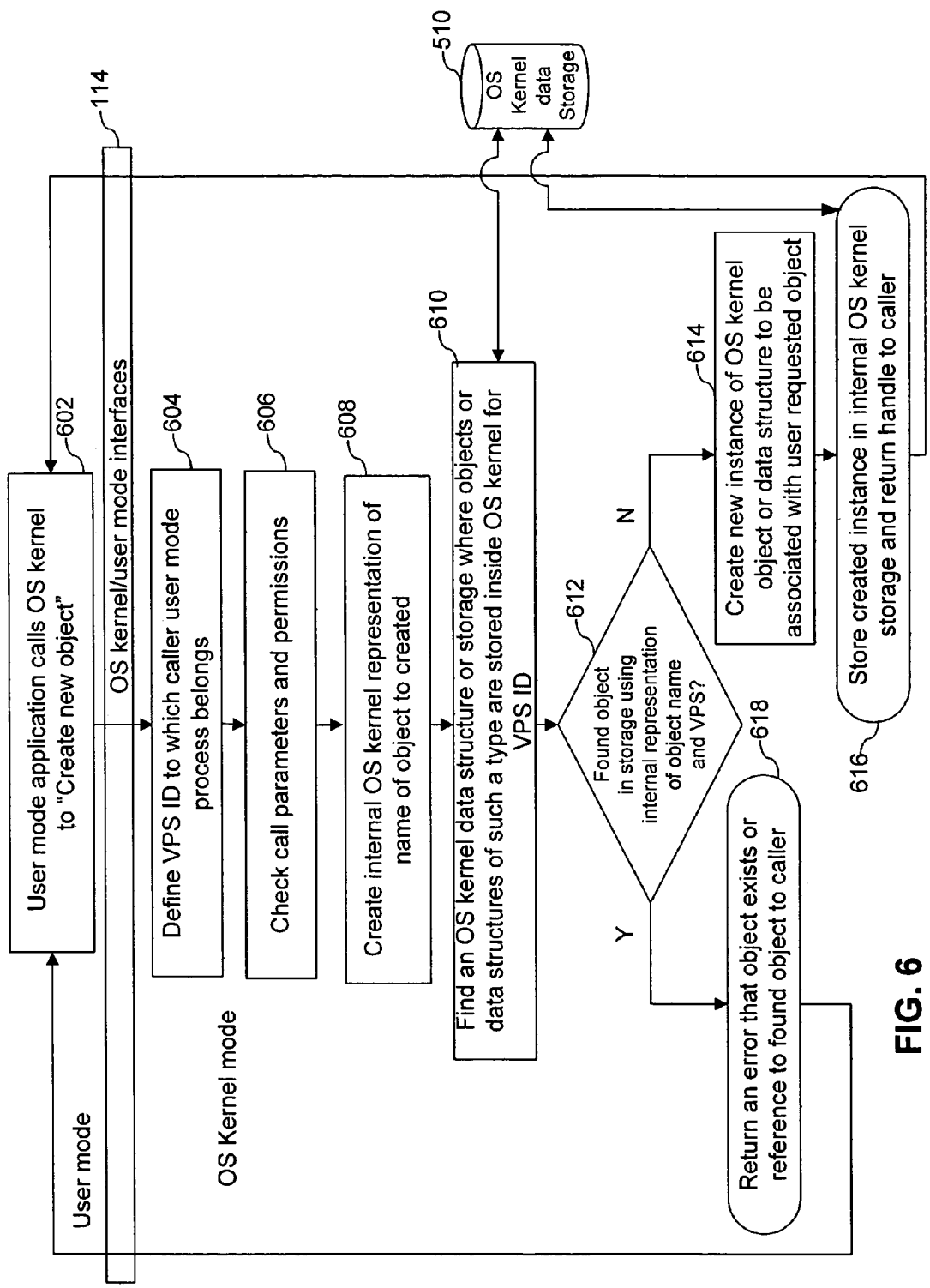
FIG. 6 illustrates another method of object creation.

FIG. 6 illustrates the creation of objects 124A according to the present invention, which permits isolation between the various VPSs 104. As shown in FIG. 6, a service 106 running in the user mode 120 calls the kernel 108 to create a new object (step 602). In the OS kernel mode 108, the VPS ID to which this process belongs is identified (step 604). Call parameters and permissions of the caller are checked based on the VPS ID and optionally other conditions (step 606). An internal representation within the OS kernel 108 is created, including the name of the object (step 608). A storage 510 is searched for OS kernel data structure, where objects or data structures of this type are stored for that particular VPS ID. If such an object is found (step 612) an error is returned that such an object exists (step 618). If no such object is found a new instance of such an object 124A is created, such that it will be associated with the user request (step 614). An instance of the object name is stored in the storage 510, and a handle (or object id) is returned to the caller (step 616). The process then proceeds back to step 602 to continue execution.

The user 112 (e.g., a client or a VPS administrator) also has various mechanisms for controlling the VPS 104, for example, system administrator privileges that extend only to the administration of that particular VPS 104. The VPS 104 also has means for delivering to the user processes the results of the work performed in response to user requests, such as delivery of information, webpages, data from databases, word processing documents, system call results other files, etc. The VPSs 104 of the present invention permits isolation of each VPS 104 from other VPSs 104 running on the same physical host 102. This is achieved through a number of mechanisms, as described below:

An address isolation of user services allows specifying different addresses for the different services that are located in different copies of the VPSs 104. Each service or application launched with the VPS 104 should preferably be individually addressable. Users of that VPS 104 should be able to select an address and identify the server located within that particular VPS 104. A typical example of such an address is an IP address of the webserver (or DNS name), or network SMB name in MS Network, used for access of MS Windows shared resources, or a telnet server address, used for interactive login. When choosing a particular address, the user must be certain that he will be accessing the server associated with that IP address, and no other, and that someone trying an address that does not belong to that VPS 104 will not be accessing that VPS 104.

Another example of address isolation is isolation of credentials necessary for system login and authentication. In that case, even after entering a login of the VPS 104, the user will only be authenticated for that VPS 104, where he exists as a user. Anywhere else in the host 102, trying to access an incorrect IP address will result in service denial.

Isolation of all objects is implemented at the operating system kernel level, which insures that no process running on one VPS 104 can take advantage of objects running on any other VPS 104. This includes an inability by any user processes or any VPS 104 to renumber any object that does not belong to that particular VPS 104 or to effect a change of the state of any such object that does not belong to that particular VPS 104. This is necessary in order to prevent a malicious user from using application software to access another VPS 104. An example of such an attempt is a possibility of "killing a process" on another VPS 104. In this case, the user calls a special function in the kernel 108 (syscall), which can force the process kill, and whose function call parameter is the identifier of the process ("pid") to be killed. Without effective object isolation, a malicious user can kill processes on other VPSs 104. A similar concept applies to other objects and structures of the kernel 108, which are function call parameters of an API used within an application running inside a VPS 104. Also, file systems used by the VPS 104 need isolation to avoid being accessed by a malicious user on a different VPS 104. Thus, the invention prevents the use of system-offered APIs by one VPS's application to affect objects and structures associated with another VPS 104.

System resource isolation is necessary to ensure fulfillment of SLA conditions and guarantees. Each VPS 104, upon creation, has a set of resources allocated to it by the kernel 108. Examples of such resources are disk space, CPU time, memory use, etc., which may be used by processes within each VPS 104. The primary goal of such isolation is prevention of "hogging" of system resources by one VPS's process or processes.

Such hogging could prevent other VPSs 104 from delivering a satisfactory level of service to their users. This can occur accidentally, due to an error in a particular application, or deliberately, when one user attempts a Denial of Service attack. These resources may be external-oriented (e.g., network traffic and bandwidth), or host-specific, such as cache space dedicated by the kernel 108 to this process. A part of resource isolation is therefore ensuring a minimum level of service and minimum speed of execution of the user processes.

Additionally, failure isolation is also provided between processes running on one VPS 104 and processes running on other VPSs 104. This includes isolation from application crashes, webserver crashes and various other failure modes to which such processes are susceptible. Failure isolation implies that the same process cannot serve users of different VPSs 104. For example, with conventional shared webhosting, all users receive an ability to use different virtual webservers that are nevertheless hosted by the same actual ("real") webserver host. In this case, if a user of one webserver gains access to the host or gains exclusive access to its resources (e.g., through a CGI script), then all other users of all other virtual webservers will be unable to receive service. A badly written CGI script can easily use up significant CPU resources (for example, approaching 100% of the CPU resources), leaving almost nothing for other users. An example of a badly written CGI script is an infinite loop, as follows:

line 1
goto line 1

Failure isolation is in part obtained through resource isolation, although it also includes the functioning of the server as a whole, beyond just resource utilization by a particular process or user.

In the present invention, failure isolation is realized at the kernel level. In the conventional approach, failure isolation is usually done in the user space through application code checks and library changes. However, a malicious user can change the code of his own process in order to defeat the isolation, since he has access to his own code. This permits, for example, a Denial of Service attack.

Another conventional approach uses special user processes launched in user space. This has a severe overhead impact, since each OS call goes through a lengthy process of various additional calls in the different address spaces of different user mode processes.

Another way of effecting isolation is through hardware emulation in the user process, which can launch an operating system shell. An example of such an approach is an emulator from VMWare (see, e.g., http://www.championsg.com/Champions_InnSite_v10.nsf/pages/Vmware). This approach ensures isolation, but results in additional overhead of having a "kernel above a kernel"—one real kernel, one emulated one. RAM use is highly inefficient in this case, since each kernel requires its own physical memory space. In contrast, the present invention provides the advantages of low overhead and high efficiency of RAM utilization, combined with scalable and effective isolation of the VPS processes from other VPSs.

It should be noted that the isolation of the VPSs 104 from each other as described above is accomplished through the use of objects and data structures of the operating system kernel 108. Support of multiple VPSs 104 can be implemented within a single OS kernel 108, further enhancing the isolation of the operating system to isolate the VPSs 104 from each other.

Figure 7:
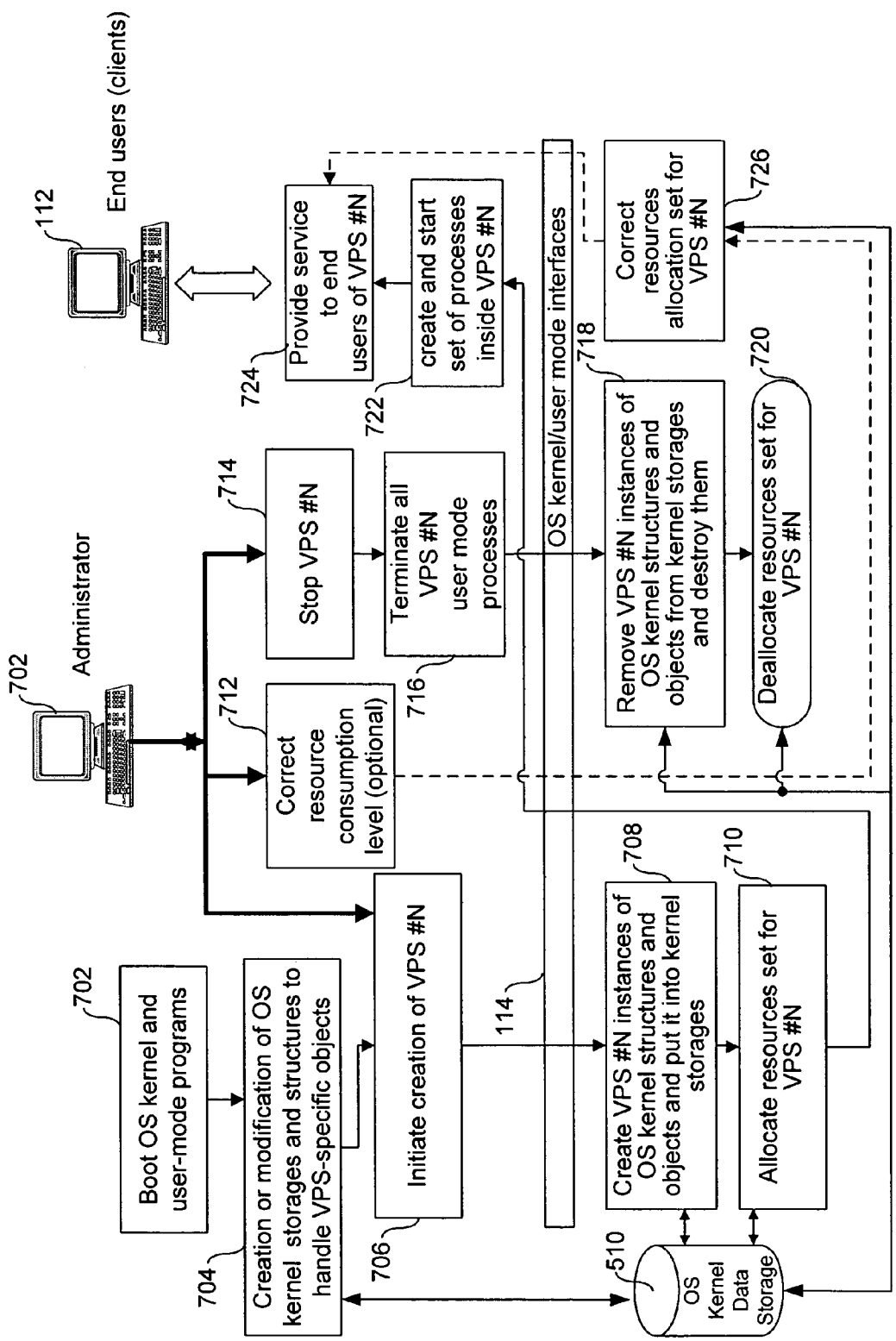
FIG. 7 illustrates a life cycle of a VPS according to the present invention.

FIG. 7 illustrates the process of a life cycle of a VPS 104 according to the present invention. As shown in FIG. 7, the OS kernel 108 and various user mode programs are booted up (step 702). OS kernel storages and structures that handle VPS-specific objects (see 510 in FIG. 6) are either created and/or modified (step 704). A VPS #N with an ID number N is created (step 706). Instances of OS kernel objects and data structures corresponding to the VPS #N are created and placed in storage (step 708). A set of resources are allocated for the VPS #N (step 710). Processes are started and/or create inside the VPS #N (step 722). The VPS #N provides services to the end user 112 (step 724). The host system administrator has the option of initiating creation of the VPS #N (step 706), correction of resource consumption level (step 712) and of the resource allocation level (step 726) or to stop a VPS #N (step 714). Upon stopping of the VPS #N, user mode processes for that VPS are terminated (step 716). All instances of OS kernel objects and structures corresponding to VPS #N are deleted or removed (step 718). All resources allocated to VPS #N are de-allocated (step 720).

It should be noted that identification of the call context, which identifies which particular VPS 104 made the request to create an object, is an important aspect of object isolation. Without it, the operating system typically will be unable to determine whether a particular action is or is not allowed for the particular call. In the present invention, the operating system creates a data structure that stores the information corresponding to the VPS 104, which usually occurs when the VPS itself is created. Some of the information may be stored permanently. For example, in the file system there may be a configuration file for each VPS. The data structure also typically includes a number of parameters used for the functioning of the VPS 104 itself. Preferably, there is a short way of naming the VPSs 104, such that searching through the data structure can be accomplished rapidly. This may be a VPS ID, which can be, for example, a number, an alphanumeric string, or similar constructs. Those objects that are unambiguously identified as associated with a particular VPS 104 typically cannot be reassociated with another VPS, since such a possibility usually suggests a concurrent possibility of a security hole. In other words, if a process 132 is "born" in the context of one VPS 104, it cannot then live in another VPS.

The process of context identification of a particular call usually needs to define which VPS made the call, in other words, from which context this call originated. If the call to create an object 124A is generated from within user space 120, then to identify the VPS context, it is only necessary to identify the corresponding process ID, and through the process ID, it is possible to determine the VPS ID to which that process 132 belongs. If the call to create an object 124A is generated within the operating system kernel 108 itself and has no apparent user initiating that call (for example, receipt of a packet from a network adapter, which needs to be identified through its IP address), then the method of its identification depends on the context of the call and is typically defined by a special algorithm, which is dependent on a particular implementation.

Determination of a VPS ID that corresponds to the process is also implementation-specific, and may be done through adding to each process structure a VPS ID at the moment a process is created. This is similar to session ID in Microsoft Windows Terminal Server. Alternatively, there may be a list of how process IDs correspond to VPS IDs, where the process IDs are globally unique. In other words, each process has a globally unique ID in the context of the entire host. As yet another option, process IDs may be duplicated. In a sense, that process IDs are unique only within the context of a particular VPS, but not necessarily globally unique within the entire host 102. Then, a different mechanism would be necessary for determining the call context (instead of relying on the process ID).

In the embodiment shown in FIG. 7, it is generally assumed that all processes that are "born" from a process 132 that has been previously launched within a particular VPS 104, belong to that VPS 104.

Normally, a VPS 104 is launched by launching a special process, with which a particular VPS ID is associated. After that process with the initial ID starts, other processes, which service that particular process, can be launched, such that they will themselves inherit the VPS ID of that particular parent process.

The present invention offers a significant advantage from the perspective of a system administrator of the host. Because of the various isolation capabilities, the effective utilization of the physical resources of the host may be significantly enhanced. This ultimately results in a lower total cost of ownership (TCO) in an enterprise or data center operation. Such a lower cost of ownership may be due to a reduced need to purchase additional hardware or hardware upgrades, less overhead associated with space rental, air conditioning, power, etc. There may also be lower network costs, and lower administrative overhead from installation or training. Administration of upgrades may also be less expensive because of similarity of user environments and other reasons, and customer satisfaction may be greater due to less apparent system failure and better ability by the data center to adhere to the service level agreement guarantees. Additionally, VPS owners can easily delegate some administration duties to data center administrator.

In one embodiment of the present invention, the VPSs 104 may be implemented as a software expansion of capabilities of Windows-based servers (i.e., "add-ons"), for example, Microsoft Windows NT servers, Microsoft Windows 2000 servers, Microsoft Windows server 2003, and various derivatives thereof, by adding the missing isolation mechanisms and VPS resource management mechanisms to the operating system kernels of those operating systems.

In order to implement the VPS 104 of the present invention, the following steps typically need to be followed. First, the operating system needs to be installed initially on the computer. The software supporting the function of the VPSs 104 needs to be installed including, if necessary, various modules and programs residing within the operating system kernel. Additionally, various service modules and daemons, which function in user space 120, also may need to be installed. The operating system needs to be configured for support of the VPSs 104, for example, by installation of optional templates for subdividing the virtual address space and the file space between the various VPSs 104. The operating system may optionally need to be rebooted. Additional interfaces may need to be provided (such as system calls, ioctls, and other such resources) in order to enable client access to the various application software modules and other operating system functions that are normally accessible to the clients, and/or that enable the functionality of the VPSs 104.

The VPS functionality for each VPS 104 typically includes creation of a corresponding file structure and files to be used by the VPS 104. These may include, e.g., administrative files, user files, etc. Information relating to the particular VPS 104 is registered in a registration database and various other similar structures maintained by the operating system. This information is intended to enable continued functioning of the VPS 104. Additionally, each VPS 104 may be allocated its own IP address or group of IP addresses and other network resources.

The VPS 104 is then launched, after which the operating system starts running a number of processes or threads corresponding to the users 112 of that particular VPS 104. User process requests are then serviced by the host 102, with these requests being passed through the VPS 104 to the operating system kernel 108. Upon termination or shutdown of a particular VPS 104, all threads and processes associated with that VPS 104 are also terminated.

In general, in order to implement the present invention, the address space is divided into two areas: kernel space 108, which is used by the operating system in kernel mode, and is normally is not accessible by application software run by the users 112, and a set of virtual address spaces dedicated to user processes, generally referred to as "user space," 120, in which the VPSs 104 and the user applications 132 running in them exist. Each VPS 104 has its own set of addresses used by user processes during to access different data locally and across a network. This is done in order to prevent security violations by a VPS 104. In the present invention, some of the VPS functionality may exist in the kernel space 108. Some of the functionality can also exist in the user space 120. In the user space 120, there may be software 130 supporting the needs of the operating system kernel. An example of such functionality may be a daemon that gathers statistics about the VPS 104 use. Another example may be a daemon that monitors VPS 104 processes, etc.

As noted above, each VPS 104 has a number of objects associated with it. Such objects are representative of the users 112, corresponding user processes and/or the applications being run within that VPS 104. Examples of such objects are file descriptors, security tokens, graphical objects (for example, used by graphical software to represent images), etc. Examples of objects 124D within the operating system kernel 108 are file descriptors, etc. Here, a data structure may be thought of as a special (simple) case of an object that does not include functional aspects associated with the object.

The VPS ID discussed above may be also thought of as similar to a mark or a handle, or a similar identifier or structure data structure that can be used for VPS 104 tracking. Thus, the isolation is done through the tracking of VPS 104 and the objects associated with that VPS 104 by a VPS ID.

Although the description above is in terms of a single host 102 running multiple VPSs 104, the invention is equally applicable to a server cluster, where multiple hosts 102 are tied together. Also, the present invention is applicable to any type of server, for example, web server, LAN server, WAN, intranet server, etc.

Figure 8:
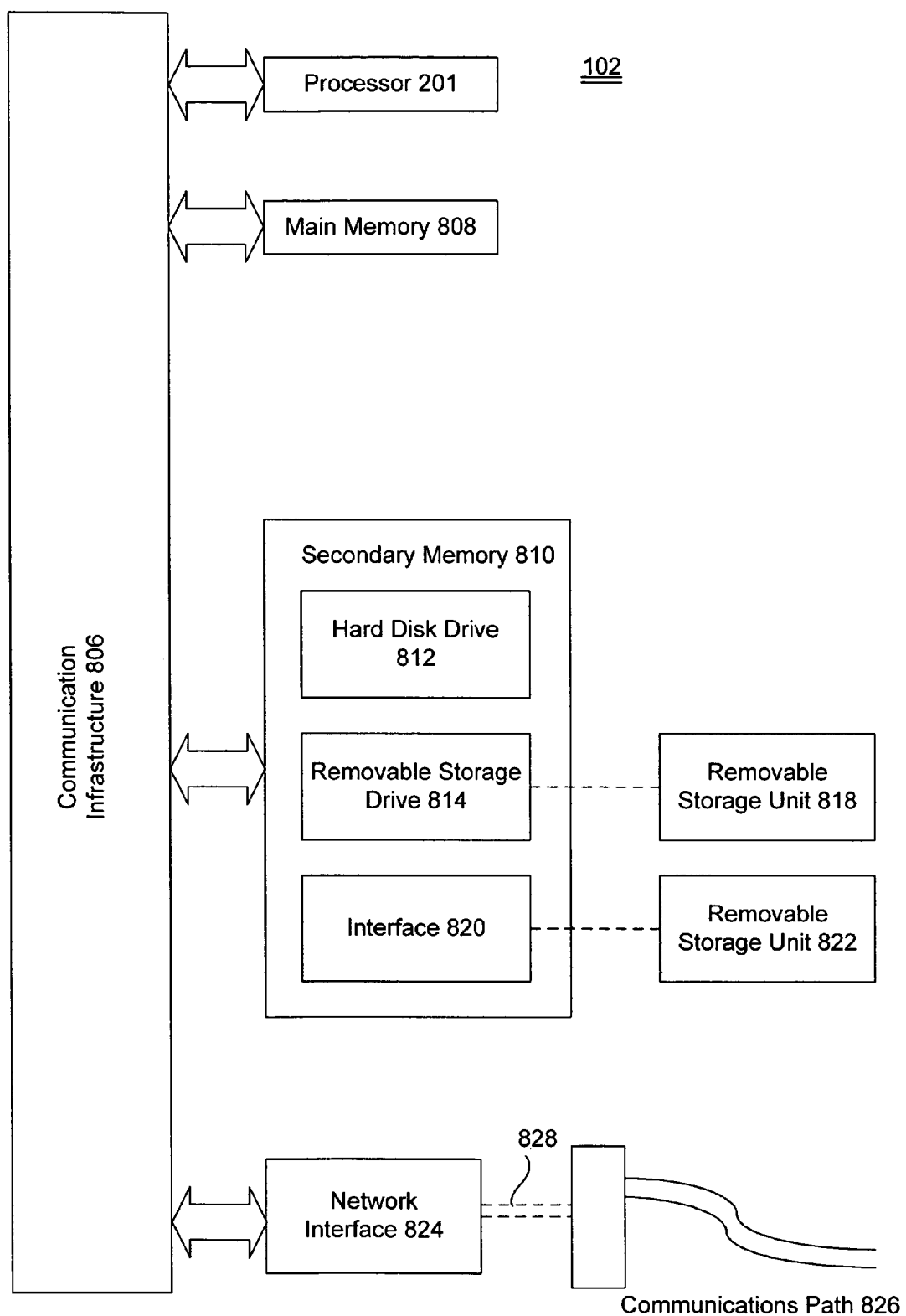
FIG. 8 illustrates an example of a host architecture that may be used in the present invention.

An example of the host 102 is illustrated in FIG. 8. The host 102 includes one or more processors, such as processor 201. The processor 201 is connected to a communication infrastructure 806, such as a bus or network). Various software implementations are described in terms of this exemplary computer system. After reading this description, it will become apparent to a person skilled in the relevant art how to implement the invention using other computer systems and/or computer architectures.

Host 102 also includes a main memory 808, preferably random access memory (RAM), and may also include a secondary memory 810. The secondary memory 810 may include, for example, a hard disk drive 812 and/or a removable storage drive 814, representing a magnetic tape drive, an optical disk drive, etc. The removable storage drive 814 reads from and/or writes to a removable storage unit 818 in a well known manner. Removable storage unit 818 represents a magnetic tape, optical disk, or other storage medium that is read by and written to by removable storage drive 814. As will be appreciated, the removable storage unit 818 can include a computer usable storage medium having stored therein computer software and/or data.

In alternative implementations, secondary memory 810 may include other means for allowing computer programs or other instructions to be loaded into computer system 800. Such means may include, for example, a removable storage unit 822 and an interface 820. An example of such means may include a removable memory chip (such as an EPROM, or PROM) and associated socket, or other removable storage units 822 and interfaces 820 which allow software and data to be transferred from the removable storage unit 822 to computer system 800.

Computer system 800 may also include one or more communications interfaces, such as communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. This channel 826 carries signals 828 and may be implemented using wire or cable, fiber optics, an RF link and other communications channels. In an embodiment of the invention, signals 828 comprise data packets sent to processor 201. Information representing processed packets can also be sent in the form of signals 828 from processor 201 through communications path 826.

The terms "computer program medium" and "computer usable medium" are used to generally refer to media such as removable storage units 818 and 822, a hard disk installed in hard disk drive 812, and signals 828, which provide software to the host 102.

Computer programs are stored in main memory 808 and/or secondary memory 810. Computer programs may also be received via communications interface 824. Such computer programs, when executed, enable the host 102 to implement the present invention as discussed herein. In particular, the computer programs, when executed, enable the processor 201 to implement the present invention. Where the invention is implemented using software, the software may be stored in a computer program product and loaded into host 102 using removable storage drive 814, hard drive 812 or communications interface 824.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A server comprising:
a host running a single operating system (OS) kernel;
a plurality of isolated virtual private servers (VPSs) supported within the operating system kernel and all the VPSs sharing the same single operating system kernel;
a user space/kernel space interface that virtualizes the OS kernel and includes a CPU time scheduler that allocates CPU time between threads of the VPSs and ensures that a thread of one VPS does not adversely affect a CPU time allocation of threads of other VPSs;
an application available to users of the VPSs; and
an application interface that includes system calls, shared memory interfaces and I/O driver control (ioctls) for giving the users access to the application.

2. The server of claim 1, wherein each VPS has its own set of addresses and its own set of objects.

3. The server of claim 1, wherein the scheduler ensures that a thread of one VPS does not adversely affect a CPU time allocation of threads of other VPSs by setting guaranteed levels of CPU time usage for each user process and/or VPS.

4. The server of claim 3, wherein each object has a unique identifier in a context of the operating system kernel.

5. The server of claim 1, wherein the server includes a capability of compensating a particular VPS in a later time slice for under-use or over-use of the resource by the particular VPS in a current time slice.

6. The server of claim 1, further comprising isolation of server resources for each VPS.

7. The server of claim 1, wherein each VPS cannot affect an object of another VPS.

8. The server of claim 1, wherein each VPS cannot affect an object of the OS kernel.

9. The server of claim 1, wherein each VPS cannot access information about a process running on another VPS.

10. The server of claim 1, wherein each VPS includes:
isolation of address space of a user of one VPS from address space of a user on another VPS; and
isolation of application failure effects.

11. The server of claim 1, wherein the host includes any of:
a virtual memory allocated to each user;
a pageable memory used by the OS kernel and by user processes;
physical memory used by the user processes;
objects and data structures used by the OS kernel;
I/O resources; and
file space.

12. The server of claim 10, wherein each VPS includes:
a plurality of processes and threads servicing corresponding users;
a plurality of objects associated with the plurality of processes and threads;
a set of unique user IDs corresponding to users of a particular VPS;
a unique file space;
means for management of the particular VPS;
means for management of services offered by the particular VPS to its users; and
means for delivery of the services to the users of the particular VPS.

13. The server of claim 1, wherein the server includes any of the following:
a capability of allocating a resource to a designated VPS;
a capability of reallocating the resource to a designated VPS;
a capability of allocating the resource to a VPS in current need of resources;
a capability of reallocating the resource to a VPS in current need of resources;
a capability of dynamically reallocating the resource from one VPS to another VPS when this resource is available; and
a capability of dynamically reallocating the resource from one VPS to another VPS when commanded by the OS kernel.

14. The server of claim 6, wherein the server defines time slices, such that the resource is allocated for each time slice.

15. The server of claim 6, wherein the server defines time slices, such that the resource is reallocated for each time slice from one VPS to any of another VPS, the OS kernel, an application software daemon and a system software daemon.

16. The server of claim 15, wherein the server dynamically partitions and dedicates the resource to the VPSs based on a service level agreement.

17. The server of claim 1, wherein all the VPSs are supported within the same OS kernel.

18. The server of claim 1, wherein some functionality of the VPSs is supported in user mode.

19. The server of claim 1, wherein the server is implemented as an add-on to any of Microsoft Windows NT server, Microsoft Windows 2000 server, and Microsoft Windows Server 2003 server.

20. The server of claim 1, wherein the server is implemented as an add-on to a server based on a Microsoft Windows product.

21. The server of claim 1, wherein the operating system kernel includes at least one process and thread for processing of user requests.

22. A server comprising:
a computer system running a single operating system (OS) kernel;
a plurality of virtual private servers (VPSs) running on the computer system, wherein each VPS functionally appears to a user as a dedicated server, and all the VPSs sharing the same single operating system kernel;
a user space/kernel space interface that virtualizes the OS kernel and includes a CPU time scheduler that allocates CPU time between threads of the VPSs and prevents a thread of one VPS from adversely affecting a CPU time allocation of threads of other VPSs;
a plurality of applications running within the VPSs and available to users of the VPSs; and
an application interface that includes system calls, shared memory interfaces and I/O driver control (ioctls) for giving the users for giving the users access to the application.

23. The server of claim 22, wherein each VPS is isolated from any other VPS.

24. The server of claim 22, wherein each VPS has its own set of addresses.

25. The server of claim 24, wherein each VPS has its own objects.

26. The server of claim 25, wherein each object has a unique identifier in a context of the OS kernel.

27. The server of claim 1, wherein each VPS manages individual user resource limitations.

28. The server of claim 22, wherein each VPS cannot affect an object of another VPS.

29. The server of claim 22, wherein each VPS cannot access information about a process running on another VPS.

30. The server of claim 22, wherein each VPS includes:
isolation of a set of addresses of a user of one VPS from addresses of a user of another VPS;
isolation of server resources for each VPS; and
isolation of application program failure effects.

31. The server of claim 22, wherein the server includes any of the following resources:
a virtual memory allocated to each user;
a pageable memory used by the OS kernel and by user processes;
physical memory used by the user processes;
objects and data structures used by the OS kernel;
I/O resources;
file space; and
individual user resource limitations.

32. The server of claim 22, wherein each VPS includes the following resources:
a plurality of processes and threads servicing corresponding users;
a plurality of objects associated with the plurality of processes and threads;
a set of unique user IDs corresponding to users of a particular VPS;
a unique file space;
means for management of the particular VPS;
means for management of services offered by the particular VPS to its users; and
means for delivery of the services to the users of the particular VPS.

33. The server of claim 22, wherein the server includes any of the following capabilities:
a capability of allocating a server resource to a designated VPS;
a capability of reallocating the server resource to a designated VPS;
a capability of allocating the server resource to a VPS in current need of that resource;
a capability of reallocating the server resource to a VPS in current need of that resource;
a capability of dynamically reallocating the server resource from one VPS to another VPS when that server resource is available;
a capability of dynamically reallocating the server resource from one VPS to another VPS when commanded by the OS kernel; and
a capability of compensating a particular VPS in a later time slice for under-use or over-use of the server resource by the particular VPS in a current time slice.

34. The server of claim 33, wherein the server defines time slices, such that the server resource is allocated for each time slice.

35. The server of claim 22, wherein the server dynamically partitions and dedicates server resources to the VPSs based on a service level agreement.

36. The server of claim 22, wherein all the VPSs are supported within the same OS kernel.

37. The server of claim 22, wherein some functionality of the VPSs is supported in user mode.

38. The server of claim 22, wherein the server is implemented as an add-on to any of Microsoft Windows NT server, Microsoft Windows 2000 server, and Microsoft Windows Server 2003 server.

39. The server of claim 22, wherein the server is implemented as an add-on to a server based on a Microsoft Windows product.

40. The server of claim 22, wherein the operating system includes at least one process and thread for execution of user requests.

41. A server comprising:
a host running a single operating system (OS) kernel;
a plurality of isolated virtual private servers (VPSs) running on the host, and all the VPSs sharing the same single operating system kernel;
a user space/kernel space interface that virtualizes the OS kernel and includes a CPU time scheduler that allocates CPU time between threads of the VPSs and prevents a thread of one VPS from adversely affecting a CPU time allocation of threads of other VPSs;
wherein the server includes a capability of dynamically reallocating host resources to a first VPS when a second VPS is under-utilizing its resources; and wherein the server includes an application interface that includes system calls, shared memory interfaces, and I/O driver control (ioctls) for giving the users access to the application.

42. The server of claim 41, wherein the server includes a capability of compensating a particular VPS in a later period for under-use or over-use of the host resources by the particular VPS in a current period.

43. A method of managing a server comprising:
defining a virtual private server (VPS) ID corresponding to a VPS, wherein multiple VPSs are running on the server and all the VPSs share a single operating system kernel of the server;
wherein the server includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and
wherein the server includes an application interface that includes system calls, shared memory interfaces, and I/O driver control (ioctls) for giving the users access to the application;
receiving a request from a VPS process to create an object;
creating an internal operating system (OS) kernel representation of the object;
checking whether such an object already exists in OS kernel storage;
if no such object exists in the OS kernel storage, creating an instance of the object to be associated with the VPS ID; and
if such an object already exists in the OS kernel storage, one of rejecting the request and returning the existing object to the VPS process.

44. The method of claim 43, wherein the VPS process is a user mode process.

45. The method of claim 43, wherein the VPS process is an application running within the VPS.

46. The method of claim 43, further including the step of storing a representation of the newly created instance of the object in the OS kernel storage.

47. The method of claim 46, wherein the storage is an OS kernel cache.

48. The method of claim 46, wherein the storage is a data structure in OS kernel memory.

49. A method of managing server resources comprising:
creating a plurality of isolated virtual private servers (VPSs) running on a host and all the VPSs sharing the same single operating system kernel running on the host;
the host including a user space/kernel space interface that virtualizes the OS kernel and includes a CPU time scheduler that allocates CPU time between threads of the VPSs and prevents a thread of one VPS from adversely affecting a CPU time allocation of threads of other VPSs, and
wherein the host includes an application interface that includes system calls shared memory interfaces, and I/O driver control (ioctls) for giving the users access to the application;
allocating host resources to each VPS based on a corresponding service level agreement (SLA); and
dynamically changing the host resources available to a particular VPS when such host resources are available.

50. The method of claim 49, wherein the host resources allocated to the particular VPS are available due to underutilization by other VPSs.

51. The method of claim 49, wherein the host resources include any of CPU usage, disk space, physical memory, virtual memory and bandwidth.

52. The method of claim 49, further including the step of reserving a particular host resource for the particular VPS.

53. The method of claim 49, wherein the step of dynamically changing the host resources allocates resources that exceed SLA guarantees.

54. The method of claim 49, wherein the step of dynamically changing the host resources is performed when the SLA specifies a soft upper limit on resource allocation.

55. The method of claim 49, further including the step of compensating the particular VPS in one time period for host resource underavailability in an earlier time period.

56. A method of managing a server comprising:
creating structures of a single operating system (OS) kernel that handle isolated virtual private server (VPS) specific objects;
initiating instances of VPSs with corresponding VPS IDs, wherein all the VPS instances are supported within the OS kernel and all the VPSs share the same single operating system kernel;
wherein the host includes a user space/kernel space interface that virtualizes the OS kernel and includes a CPU time scheduler that allocates CPU time between threads of the VPSs and prevents a thread of one VPS from adversely affecting a CPU time allocation of threads of other VPSs, and
wherein the host includes an application interface that includes system calls, shared memory interfaces, and I/O driver control (ioctls) for giving the users access to the application;
generating instances of OS kernel objects corresponding to the VPS IDs; and
providing services to users of the VPSs.

57. The method of claim 56, further including the step of allocating resources to the VPSs.

58. The method of claim 57, further including the step of dynamically adjusting the allocated resources for each VPS.

59. The method of claim 56, further including the step of terminating a VPS and all its associated objects and processes based on the VPS ID.

60. A system for managing a server comprising:
means for defining a virtual private server (VPS) ID, wherein multiple VPSs are running on the server and all the VPSs share a single operating system kernel of the server;
wherein the server includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and
wherein the host includes an application interface that includes system calls, shared memory interfaces, and I/O driver control (ioctls) for giving the users access to the application;
means for receiving a request from a VPS process to create an object;
means for creating an internal operating system (OS) kernel representation of the object;
means for checking whether such an object already exists in OS kernel storage;
means for creating an instance of the object to be associated with the VPS ID if no such object exists in the OS kernel storage; and means for rejecting the request if such an object already exists in the OS kernel storage.

61. The system of claim 60, wherein the VPS process is a user mode process.

62. The system of claim 60, wherein each VPS appears to a user as functionally equivalent to a remotely accessible server.

63. The system of claim 60, wherein the VPS process is an application running within the VPS.

64. The system of claim 60, further including means for storing a representation of the object in the OS kernel storage.

65. The system of claim 60, wherein the storage is a data structure in OS kernel memory.

66. A system for managing server resources comprising:
means for creating a plurality of isolated virtual private servers (VPSs) running on a host, wherein multiple VPSs are running on the host and all the VPSs share a single operating system kernel of the server;
wherein the host includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and
wherein the host includes an application interface that includes system calls, shared memory interfaces, and I/O driver control (ioctls) for giving the users access to the application;
means for allocating host resources to each VPS based on its service level agreement (SLA); and
means for dynamically changing the host resources available to a particular VPS when such host resources are available.

67. The system of claim 66, wherein the host resources allocated to the particular VPS are available due to underutilization by other VPSs.

68. The system of claim 66, wherein the host resources include any of CPU usage, disk space, physical memory, virtual memory and bandwidth.

69. The system of claim 66, further including means for reserving a particular host resource for the particular VPS.

70. The system of claim 66, wherein the means for dynamically changing the host resources allocates resources that exceed SLA guarantees to the particular VPS.

71. The system of claim 70, wherein the means for dynamically changing the host resources increases the host resources when the SLA specifies a soft upper limit on resource allocation.

72. The system of claim 66, further including means for compensating the particular VPS in one time period for host resource underavailability in an earlier time period.

73. The system of claim 66, wherein each VPS appears to a user as functionally equivalent to a remotely accessible server.

74. A system for managing a server comprising:
means for creating structures of a single operating system (OS) kernel that handle virtual private server (VPS) specific objects;
means for initiating instances of VPSs with corresponding IDs, wherein all the instances are supported within the OS kernel, wherein all the VPSs share a single operating system kernel of the server;
wherein the server includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and
wherein the server includes an application interface that includes system calls, shared memory interfaces, and I/O driver control (ioctls) for giving the users access to the application;
means for generating instances of OS kernel objects corresponding to the VPS IDs; and
means for providing services to users of the VPSs.

75. The system of claim 74, further including means for dynamically adjusting resources allocated to each VPS.

76. The system of claim 74, further including means for terminating a VPS and all its associated objects and processes based on the VPS ID.

77. The system of claim 74, wherein each VPS appears to a user as functionally equivalent to a remotely accessible server.

78. A computer program product for managing a server, the computer program product comprising a computer useable storage medium having computer program logic recorded thereon for controlling a processor, the computer program logic comprising:
computer program code means for defining a virtual private server (VPS) ID, wherein multiple VPSs are running on the server and all the VPSs share a single operating system kernel of the server;
wherein the server includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and
wherein the server includes an application interface that includes system calls, shared memory interfaces, and I/O driver control (ioctls) for giving the users access to the application;
computer program code means for receiving a request from a VPS process to create an object;
computer program code means for creating an internal operating system (OS) kernel representation of the object;
computer program code means for checking whether such an object already exists in OS kernel storage;
computer program code means for creating a new instance of the object to be associated with the VPS ID if no such object exists in the OS kernel storage; and
computer program code means for rejecting the request if such an object already exists in the OS kernel storage.

79. A computer program product for managing server resources, the computer program product comprising a computer useable storage medium having computer program logic recorded thereon for controlling a processor, the computer program logic comprising:
computer program code means for creating a plurality of isolated virtual private servers (VPSs) running on a host, wherein multiple VPSs are running on the host and all the VPSs share a single operating system kernel of the server;
wherein the host includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and wherein the host includes an application interface that includes system calls shared memory interfaces, and I/O driver control (ioctls) for giving the users access to the application;

computer program code means for allocating host resources to each VPS based on a corresponding service level agreement; and computer program code means for dynamically changing host resources available to a particular VPS when such host resources are available.

80. A computer program product for managing a server, the computer program product comprising a computer useable storage medium having computer program logic recorded thereon for controlling a processor, the computer program logic comprising:

computer program code means for creating operating system (OS) kernel structures that handle virtual private server (VPS) specific objects, wherein multiple VPSs are running on the host and all the VPSs share a single operating system kernel of the server;

wherein the host includes a user space/kernel space interface that virtualizes the operating system kernel and includes a CPU time scheduler that allocates CPU time between threads of the VPSs and prevents a thread of one VPS from adversely affecting a CPU time allocation of threads of other VPSs, and wherein the host includes an application interface that includes system calls, shared memory interfaces and I/O driver control (ioctls) for giving the users access to the application;

computer program code means for initiating instances of VPSs with corresponding IDs, wherein all the instances are supported within the OS kernel;

computer program code means for generating instances of OS kernel objects corresponding to the VPS IDs; and computer program code means for providing services to users of the VPSs.

* * * * *